United States Patent
Altepost et al.

(10) Patent No.: US 7,640,718 B2
(45) Date of Patent: Jan. 5, 2010

(54) ATTACHMENT FOR HARVESTING STALK-LIKE GOODS WHERE EACH CUTTING AND CONVEYING ELEMENT IS CONTROLLED INDIVIDUALLY

(75) Inventors: Helmut Altepost, Höstel-Riesenbeck (DE); Hans Rauch, Bad Saulgau (DE)

(73) Assignee: Claas Saulgau GmbH, Bad Saulgau (DE)

( * ) Notice: Subject to any disclaimer, the term of this patent is extended or adjusted under 35 U.S.C. 154(b) by 0 days.

(21) Appl. No.: 11/755,214

(22) Filed: May 30, 2007

(65) Prior Publication Data

US 2007/0289281 A1      Dec. 20, 2007

(30) Foreign Application Priority Data

May 30, 2006   (DE) ................. 10 2006 025 455

(51) Int. Cl.
*A01D 69/06*   (2006.01)
(52) U.S. Cl. .................................................... 56/11.2
(58) Field of Classification Search ................. 56/11.3, 56/13.6, 64, 10.8, 11.2, 16.4 R, 10.3
See application file for complete search history.

(56) References Cited

U.S. PATENT DOCUMENTS

| | | | |
|---|---|---|---|
| 4,947,629 A * | 8/1990 | Ermacora et al. ............. 56/13.6 |
| 5,749,208 A * | 5/1998 | Wuebbels et al. ............. 56/10.3 |
| 5,784,866 A * | 7/1998 | Campbell et al. ................ 56/6 |
| 5,832,707 A * | 11/1998 | Arnold et al. ................... 56/66 |
| 6,073,429 A | 6/2000 | Wuebbels et al. |
| 6,470,658 B1* | 10/2002 | Wubbels ..................... 56/11.7 |
| 6,902,485 B2* | 6/2005 | Wubbels ..................... 464/17 |

FOREIGN PATENT DOCUMENTS

| | | |
|---|---|---|
| DE | 195 44 182 | 5/1997 |
| DE | 297 02 902 | 7/1998 |
| EP | 0 775 437 | 5/1997 |
| EP | 0 986 947 | 3/2000 |

\* cited by examiner

Primary Examiner—Árpád Fábián-Kovács
(74) Attorney, Agent, or Firm—Burr & Brown

(57) ABSTRACT

An attachment for agricultural harvesting machines for cutting, picking up and further conveying of stalk-like goods that flow into an intake gap of an intake housing of the harvesting machine for further processing, having in each case at least two cutting and conveying elements, which are spaced apart on both sides of a vertical longitudinal center plane and are driven rotationally about vertical axes, wherein the rotational direction of at least one cutting and conveying element can be changed independently of the other cutting and conveying elements of the attachment.

31 Claims, 12 Drawing Sheets

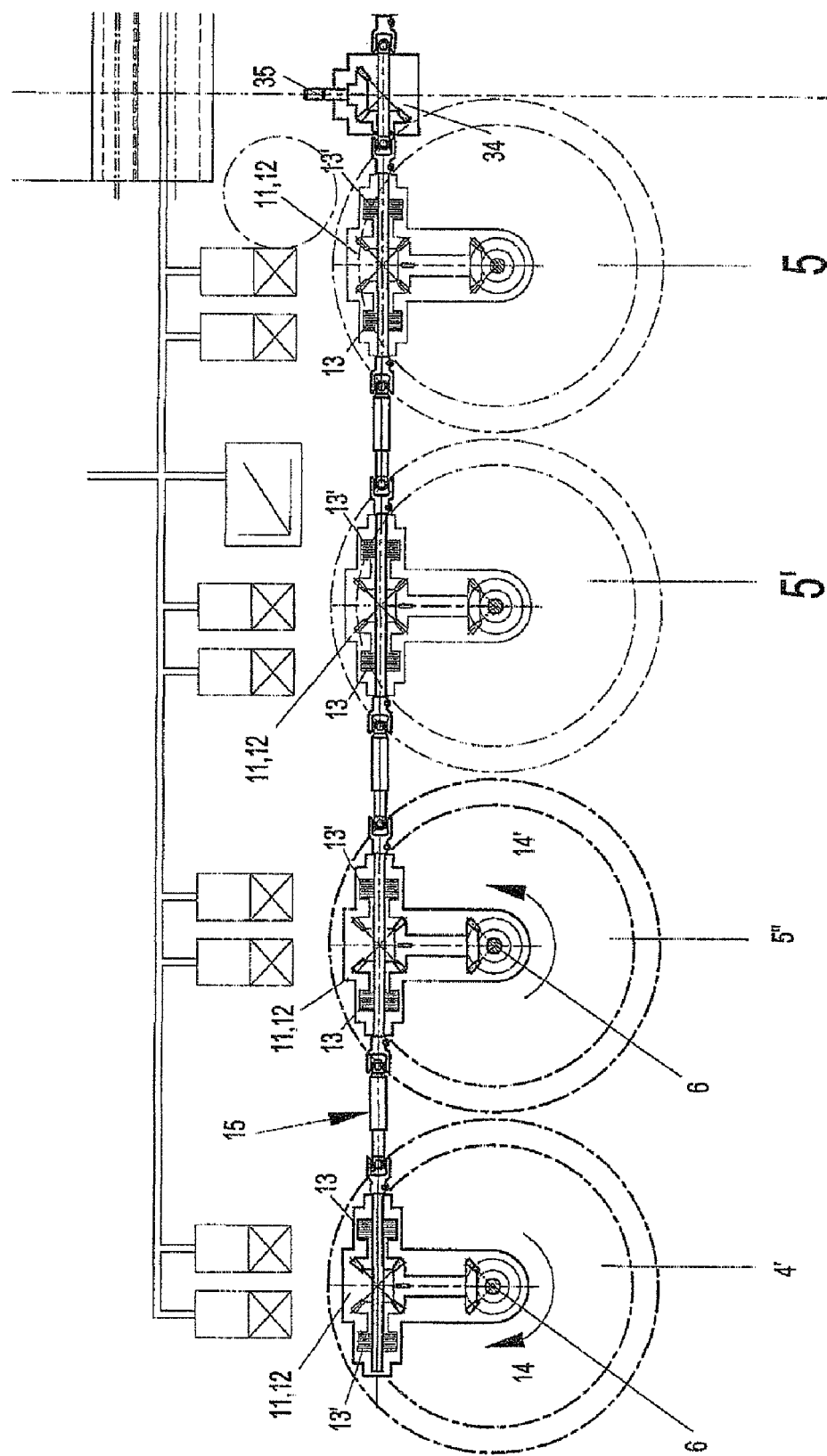

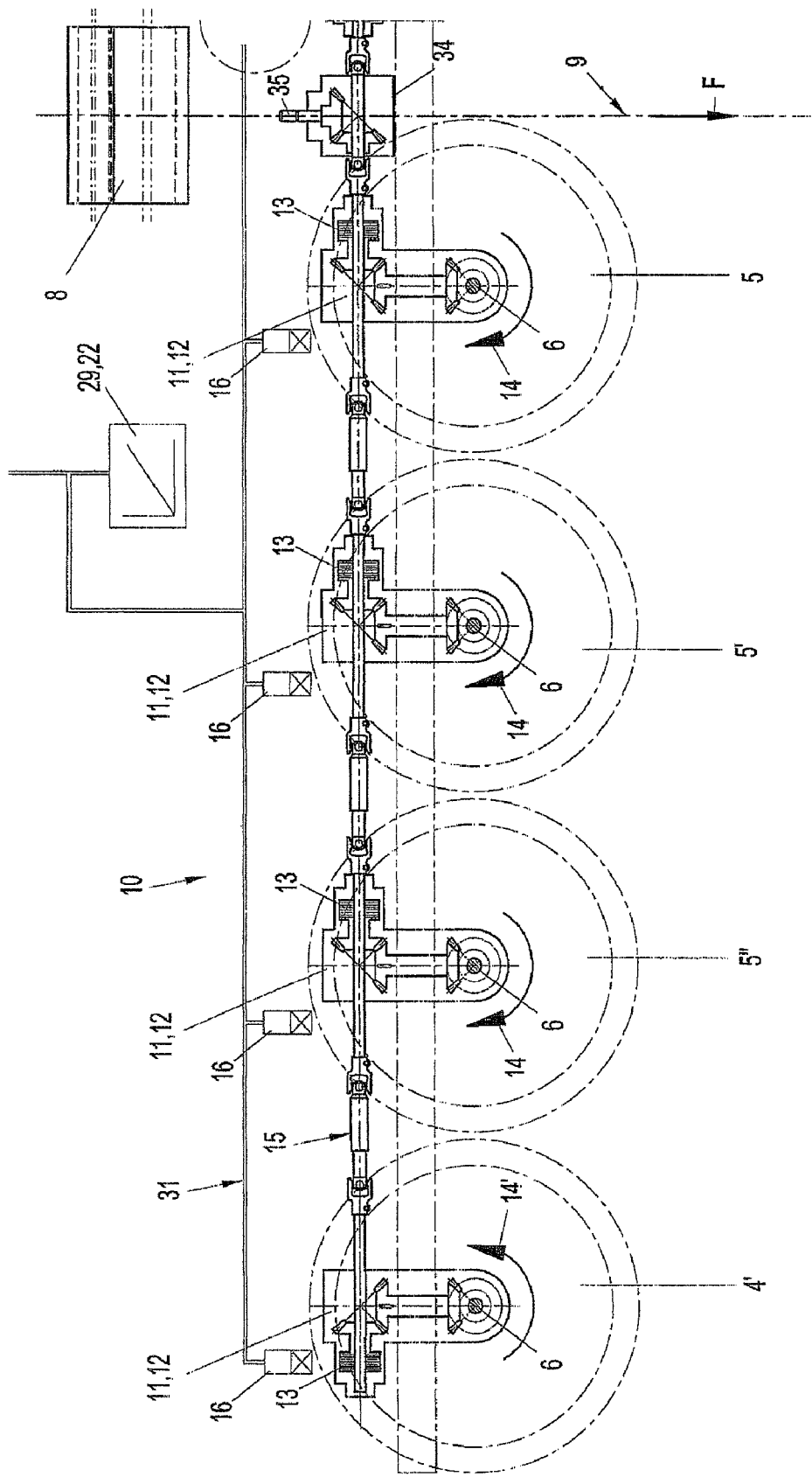

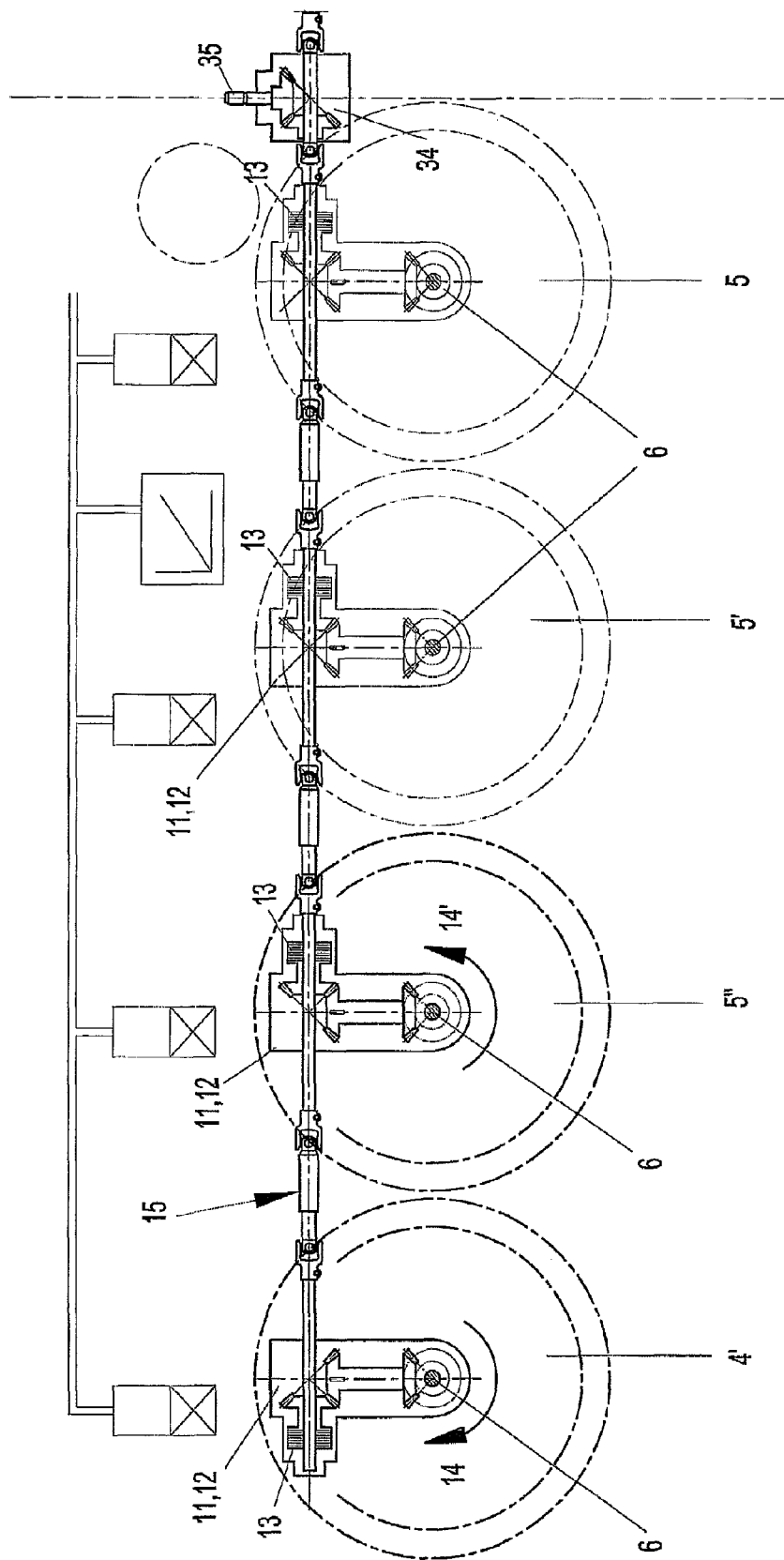

ATTACHMENT FOR HARVESTING STALK-LIKE GOODS WHERE EACH CUTTING AND CONVEYING ELEMENT IS CONTROLLED INDIVIDUALLY

CROSS REFERENCE TO RELATED APPLICATION

This application claims the benefit under 35 USC §119(a)-(d) of German Application No. 10 2006 025 455.4, filed May 30, 2006, the entirety of which is incorporated herein by reference.

FIELD OF THE INVENTION

The invention relates to an attachment for agricultural harvesting machines, in particular for a field chopper for cutting, picking up and further conveying of a stalk-like goods flow, for example for corn plants, into the intake gap of the intake housing.

BACKGROUND OF THE INVENTION

These attachments are also known, in particular, under the name of corn picker heads. These are known to a person skilled in the art in various designs. The object of these attachments for field choppers consists in cutting the standing corn plants during forward travel and transporting the cut plants further in such a way that they pass into the intake region or into the intake gap of the intake housing of the field chopper. Attachments are known having a plurality of rotationally driven cutting and conveying drums which lie next to one another transversely with respect to the travel and working direction and have disk-shaped intake elements which lie on top of one another, are equipped with conveying pockets and are additionally assigned transverse conveying and deflection elements in the rear region.

The cutting and conveying drums or cutting and conveying elements are driven by the internal combustion engine of the carrier vehicle, in a manner which starts via a mechanically driven drive train, a drive train which extends transversely with respect to the travel direction and on which the required drive moments for the cutting and conveying elements are tapped off by means of angular gear mechanisms being mounted ahead of the cutting and conveying elements. A drive of this type is known, for example, from DE19544182. If blockages occur during the continuous cutting and harvesting process, the harvesting process has to be interrupted by stopping the travel movement of the carrier vehicle and the blockage has to be eliminated by reversing the drive. DE 19653367 has disclosed a reversing drive of this type. Here, the drive of the intake rollers of the intake housing of the chopper and that of the attachment has its rotational direction reversed and is decoupled from the drive of the chopping drum in the process. It is disadvantageous here that all the cutting and conveying elements are also driven during reversing and the entire harvested goods which are situated in the attachment and in the intake housing and therefore still in front of the chopping drum are conveyed back and remain on the field as debris. Here, the greater the working width, the greater the debris which remains behind.

SUMMARY OF THE INVENTION

It is the object of the invention to propose an attachment of the abovementioned type which counteracts the risk of blockage and, if nevertheless a blockage process approaches, to detect the latter as quickly as possible and therefore to counteract the extent of the disruption as quickly as possible, in order therefore to avoid the abovementioned formation of debris to as great an extent as possible or at least to minimize the harvesting losses which are caused by reversing operations.

Here, the invention provides that the drive from each individual cutting and conveying element can be switched on or switched off or reversed from the driver stand in the cabin independently of the other cutting and conveying elements. Here, the cutting and conveying elements can either be assigned separate clutches which produce or interrupt the drive for the respective cutting and conveying elements with the main drive train or bring about the reversal of rotational direction, or, however, each conveying element can also be assigned a dedicated drive motor which can be actuated in such a way that the respective cutting and conveying elements can likewise be driven, taken out of operation or reversed.

Here, the switching processes can also be effected by a central control unit of the carrier vehicle according to one or more preselectable and stored algorithms, or else can be triggered individually and selectively in a manual manner by the driver of the carrier vehicle.

Here, for example, it is also possible, precisely during reversing, for only those cutting and conveying disks to be actuated in a targeted manner which are actually affected by the blockage, with the result that only the harvested goods which have caused the blockage are also conveyed backward. Here, it is also possible for various algorithms to be stored in the program memory of a microprocessor before reversing operations, for example so that individual cutting and conveying disks can be actuated independently of one another by themselves alone, or else two adjacent cutting and conveying disks can also be actuated by the formation of a group.

These algorithms can then also be used, for example, for the running-up phase of the cutting and conveying disks. It is also optionally possible here for the drive of the prepressing rollers to be included during reversing or, if this proves unnecessary, also to suppress the drive by the drive of the intake and pressing rollers remaining switched off during reversing.

The clutches are advantageously an integral constituent part of the respective branching-off gear mechanism of a cutting and conveying element and they are configured, for example, as clutches which can be actuated with power assistance, for example as a multiple disk clutch. However, other clutch configurations, such as claw clutches which engage and can disengage with a form-fitting fit, are also certainly provided for this application.

Here, the power assistance can be of electric, hydraulic or else pneumatic nature. Here, the clutches can also be configured at the same time as overload clutches which, for example, stop the traction drive of the carrier vehicle in the event of overloading.

If, in contrast, the rotational speed of a drive element of the associated cutting and conveying disks should drop to a predefined threshold value which is measured by measuring technology in the event of overloading, a signal is generated as a result for switching off the relevant drive of the cutting and conveying disks.

Furthermore, the invention provides for the attachment to have a dedicated closed hydraulic system for driving the cutting and conveying disks, which hydraulic system, for example, is operatively connected on the drive side to a power take-off shaft of the carrier vehicle. It is particularly advantageous here to design the hydraulic system as a load-sensing system which is regulated as a function of the load in the closed circuit with pressure cut-off means, which load-sensing system per se comprises an inexpensive and functionally reliable overload safeguard. It is also possible here that a plurality of closed operating circuits emanate from one hydraulic pump, which reduces the costs. Here, the hydraulic drive system can advantageously be a load-sensing system which is regulated by pressure and/or conveying flow and can be used, in particular, in order to save energy.

The detection by measuring technology and evaluation are effected from the interaction of the rotational speed and rotational direction sensors which are advantageously operatively connected directly to the corresponding drive elements or are part of the latter.

The input variables which are detected in this way therefore represent important input variables of a job computer which, according to the invention, is part of the attachment and is advantageously incorporated into a bus system, for example into an ISO bus. The further refinement of the invention provides for this job computer also to be connected to the central controller of the carrier vehicle via a bus connection and also to be coupled to its actuating and monitoring device, with the results that the process sequence can also be displayed visually.

The invention is shown and described by way of example using the following exemplary embodiment.

BRIEF DESCRIPTION OF THE DRAWINGS

Further details of the invention are to be gathered from the following figures and their descriptions, in which:

FIG. 2c shows an enlarged detail from FIG. 2b;

FIG. 3a shows an enlarged detail from FIG. 3;

FIG. 3c shows an enlarged detail from FIG. 3b;

DETAILED DESCRIPTION OF THE INVENTION

Figure 1:
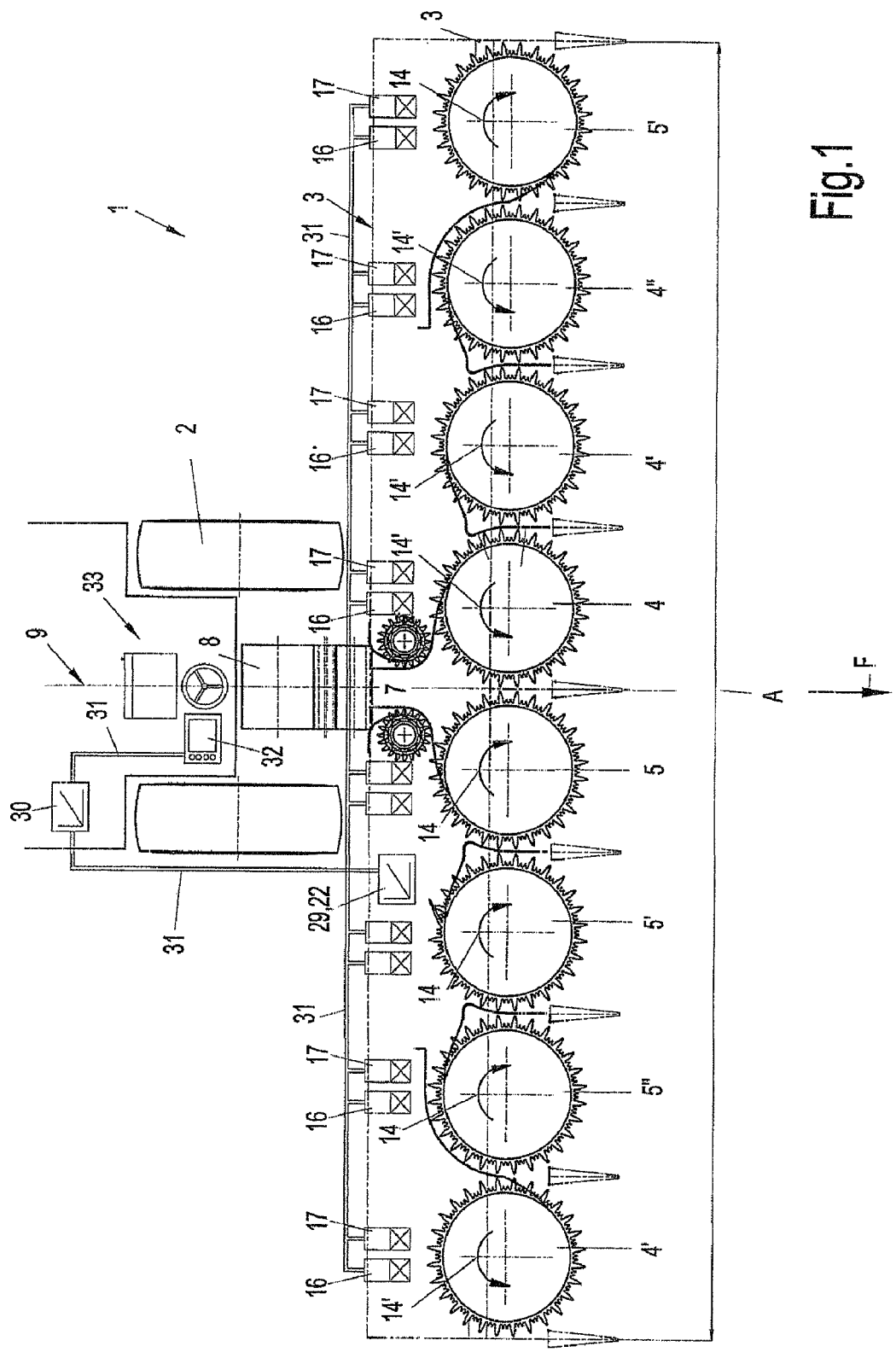
FIG. 1 shows an attachment according to the invention in a simplified illustration, in a plan view in the operating position.
Figure 2:
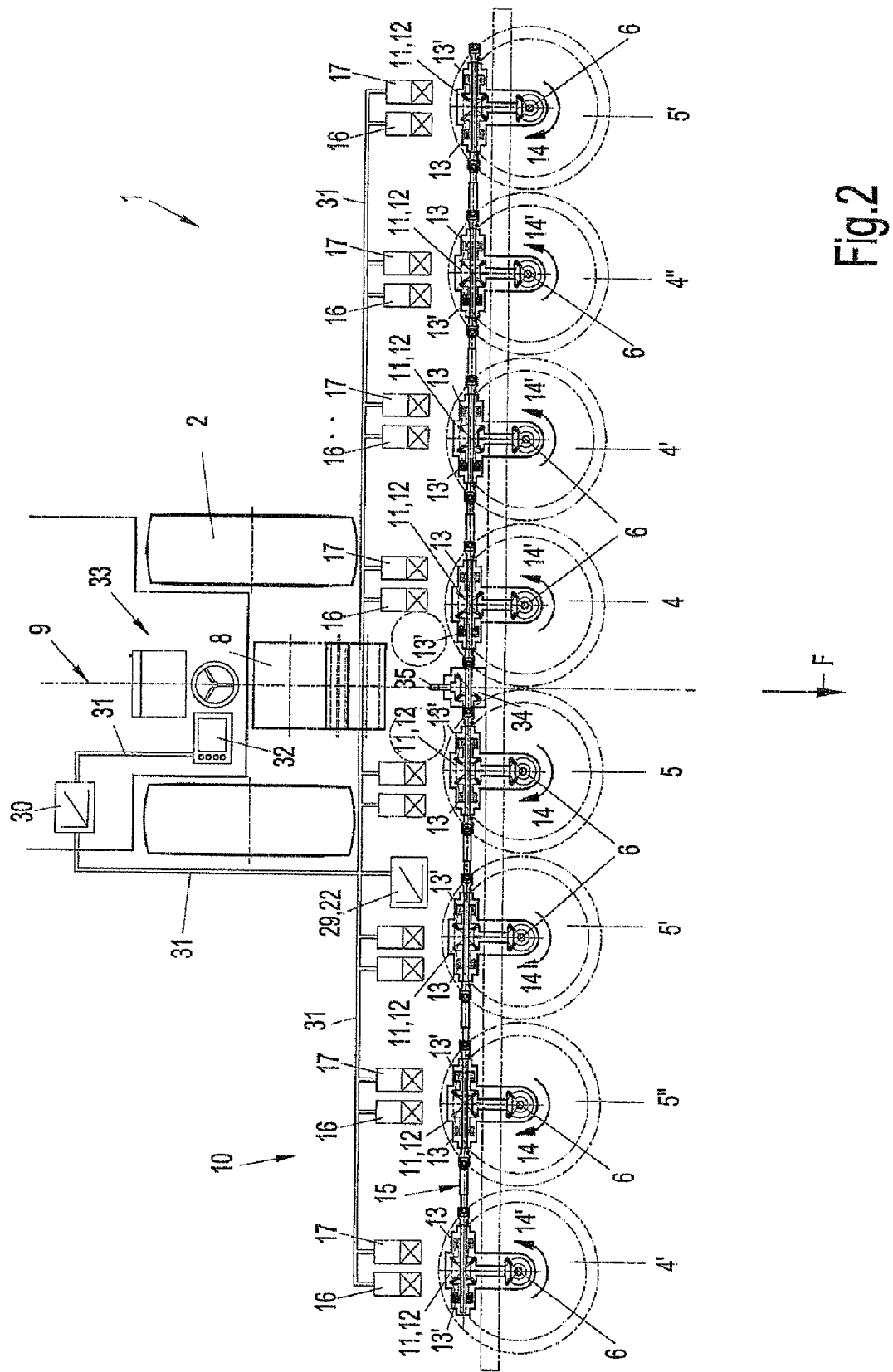
FIG. 2 shows the attachment according to FIG. 1 with a mechanical drive train according to the invention.
Figure 2A:
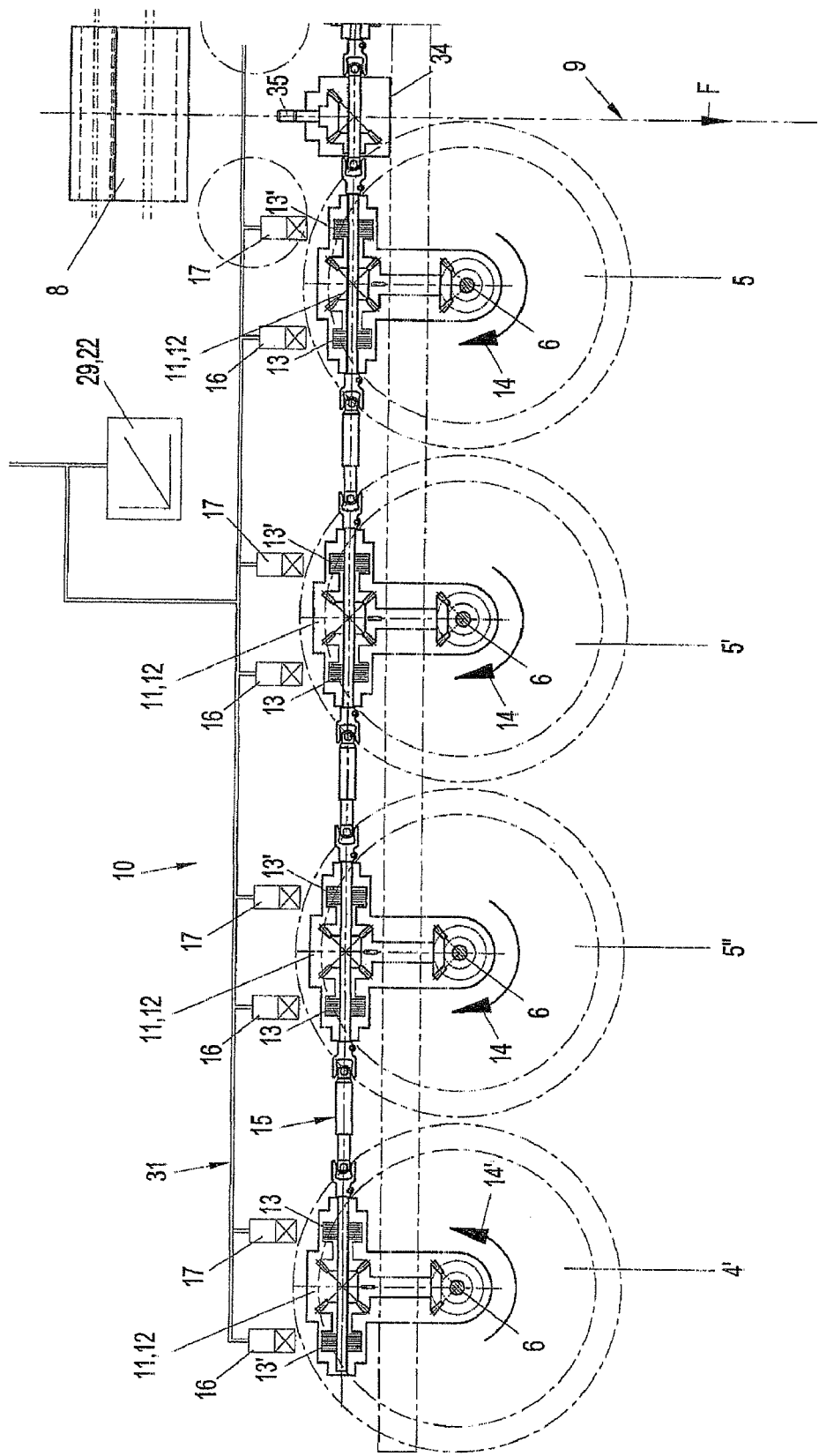
FIG. 2a shows an enlarged detail from FIG. 2.
Figure 2B:
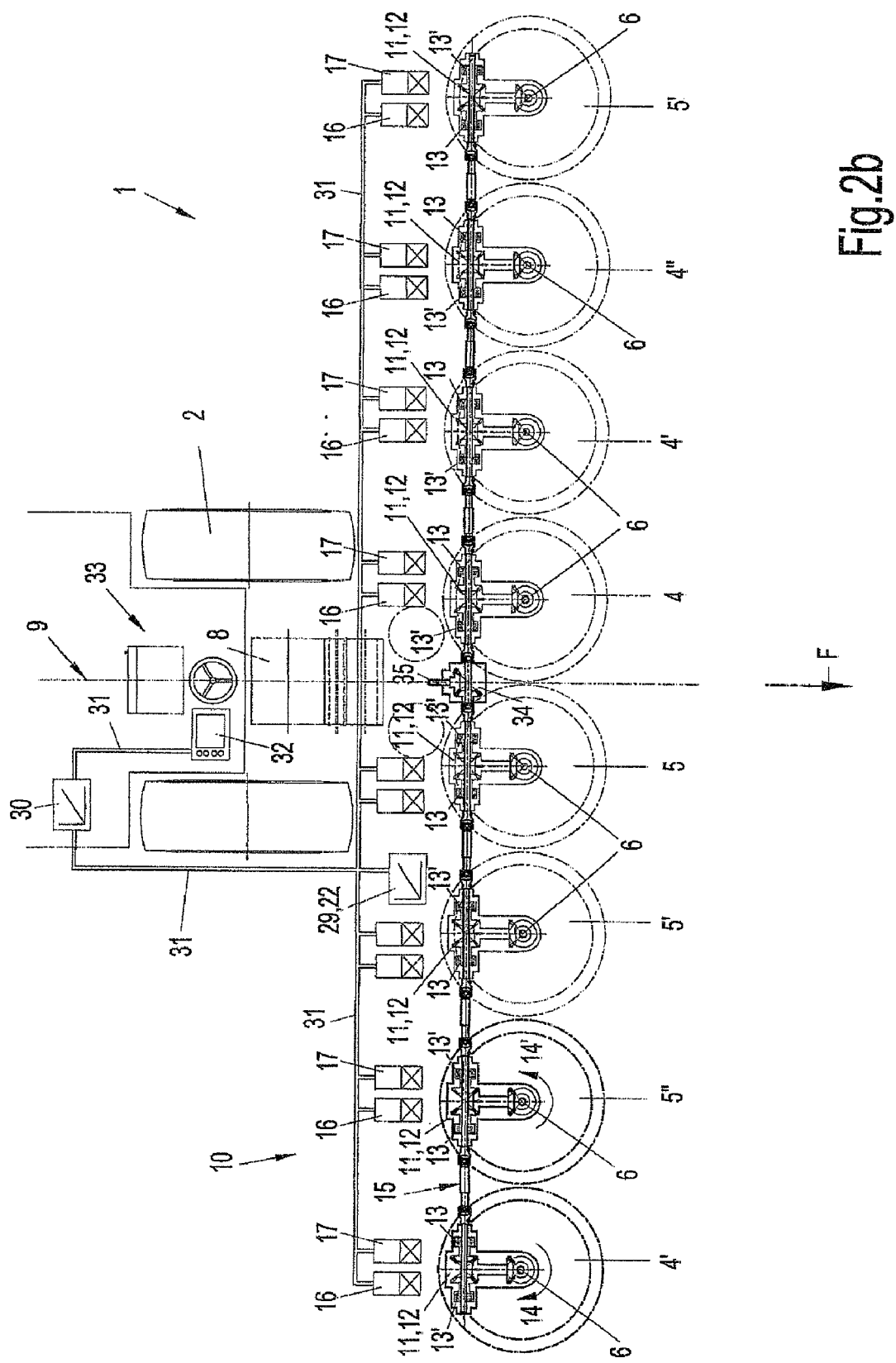
FIG. 2b shows the drive train according to FIG. 2 in a reversing position.

FIG. 1 shows an attachment 1 according to the invention, and FIG. 2 shows an enlarged detail of the attachment according to FIG. 1 with a mechanical main drive train 15, each cutting and conveying element 4, 4', 4", and 5, 5', 5" being assigned a separate drive element 11 as shifting gear mechanism 12 having in each case two clutches 13, 13'. Here, for the sake of clarity, FIG. 2a shows an enlarged detail from FIG. 2. FIG. 2b shows a drive train according to FIG. 2 in a reversing situation. Here, for the sake of clarity, FIG. 2c shows an enlarged detail from FIG. 2b.

Figure 3:
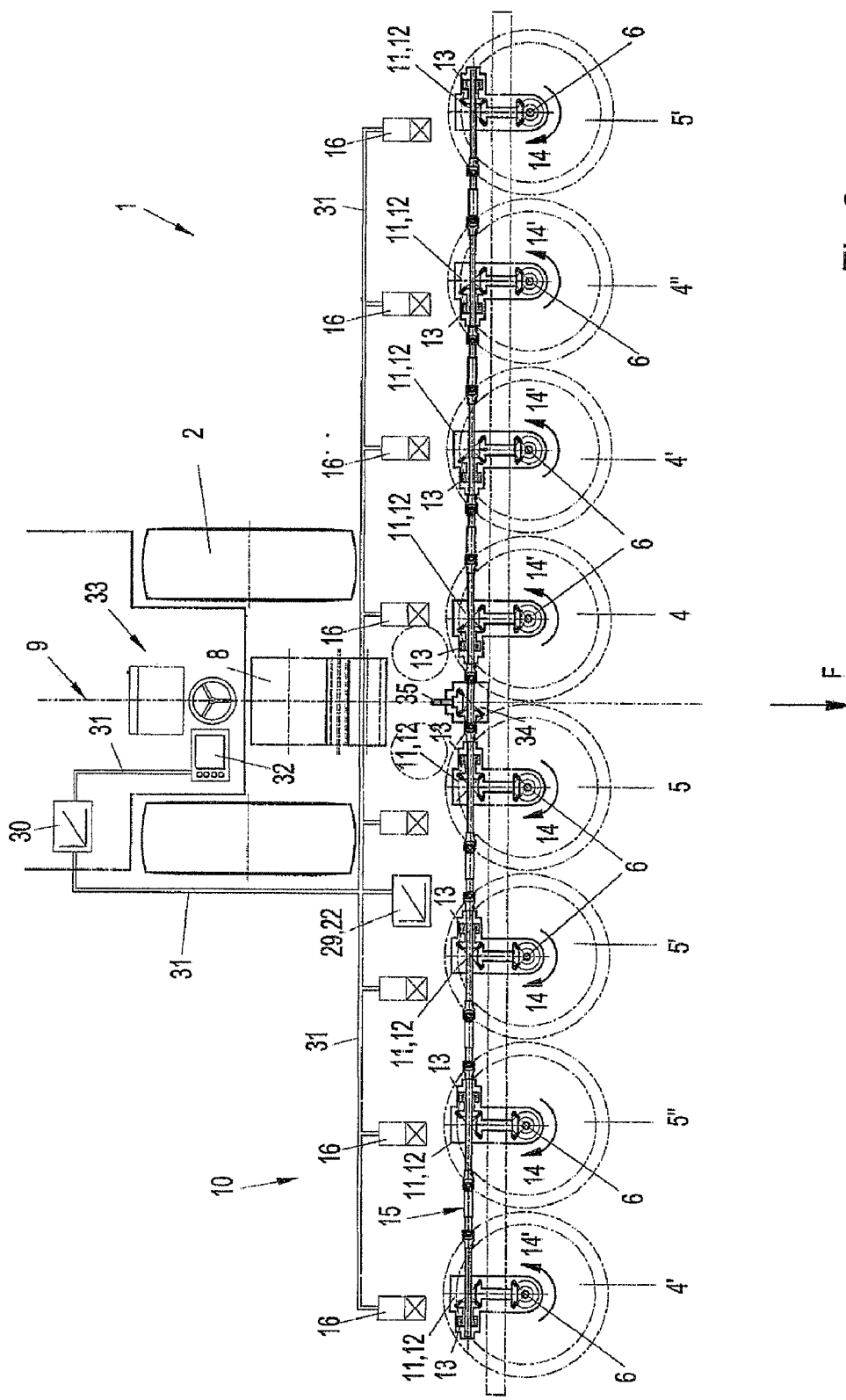
FIG. 3 shows the attachment according to FIG. 1 with a further mechanical drive train according to the invention.
Figure 3B:
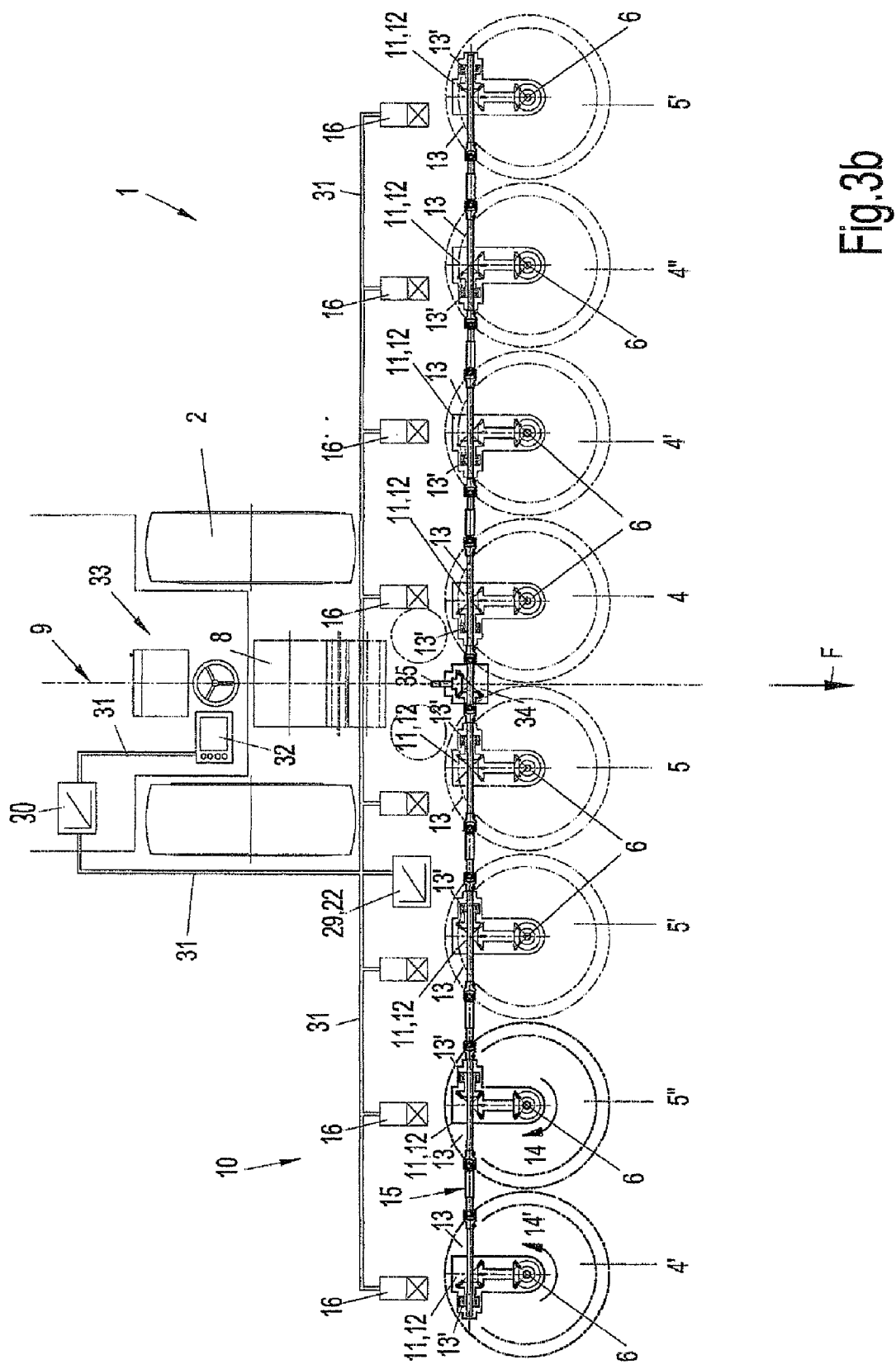
FIG. 3b shows the drive train according to FIG. 3 in a reversing situation.

FIG. 3 likewise refers back to FIG. 1, but in a different inventive refinement of the mechanical main drive train 15, each cuffing and conveying element 4, 4', 4" and 5, 5', 5" being assigned a separate drive element 11 as shifting gear mechanism 12 having in each case one clutch 13. Here, for the sake of clarity, FIG. 3a shows an enlarged detail from FIG. 3. FIG. 3b shows the drive train according to FIG. 3 in a reversing situation. Here, for the sake of clarity, FIG. 3c shows an enlarged detail from FIG. 3b.

Here, this is a corn picker head in a simplified illustration in a plan view. The rotational direction arrows 14, 14' show the rotational directions of the conveying disks of the cutting and conveying elements 4, 4', 4" and 5, 5', 5" during cutting operation. The attachment is installed in a known manner on a carrier vehicle 2 which is configured as an automotive field chopper, ahead of its intake housing 8 with its intake gap 7.

Attachments of this type are known to a person skilled in the art as exchangeable devices and corn picker heads, and they are received by a connecting device of the carrier vehicle 2 and are drive-connected to the latter.

As an exemplary embodiment, the attachment 1 which is shown comprises eight cuffing and conveying elements 4; 4', 4", 5, 5', 5" which are supported on a machine frame 3 such that they can rotate about vertical axes 6 and are mounted in an angular gear mechanism housing, and differ substantially only as a result of their rotational directions 14, 14' (14 in the clockwise direction, 14' in the anticlockwise direction). The cuffing and conveying elements 4; 4', 4", 5, 5', 5" which are driven about vertical axes cut the corn stalks in the vicinity of the soil, catch them in conveying pockets of the cuffing and intake elements and transfer them to transverse conveyors (not shown in greater detail but known to a person skilled in the art) which then collect them in conveying channels and feed them to the intake gap 7 in a manner which is guided by said conveying channels. The cuffing and conveying elements 4; 4', 4", 5, 5', 5" and their rotational directions 14, 14' are shown merely by way of example and there can be more or less cuffing and conveying elements depending on the configuration and working width A.

According to the invention, it is then possible to actuate each of the cutting and conveying elements 4; 4', 4", 5, 5', 5" with regard to its drive, that is to say to drive them rotationally in a separate manner or to take them out of operation or to reverse them. The actuation takes place from the control stand 33 or driver's seat from the driver's cabin 33. This is shown in an exemplary manner using the example of reversing of the two right-hand outer (in the travel direction) cutting and conveying elements 4', 5" in FIG. 2b and FIG. 3b, which is shown symbolically by the thicker lines of these two cutting and conveying elements.

Here, all other cuffing and conveying elements 4', 5" remain at a standstill, which means that they are taken out of operation, as the missing rotational direction arrows on these cuffing and conveying elements which are taken out of operation are shown symbolically.

In contrast, the rotational directions of the two outer cutting and conveying elements which are in the reversing state have been reversed in comparison with FIG. 1, which corresponds to the reversing operation. In both the examples which are shown, both in FIG. 2b and also in FIG. 3b, the complete drive train 15 remains switched on during reversing, that is to say remains in motion, which is shown by the thicker lines of the drive train.

This is made possible by the fact that the rotational direction 14 or 14' of at least one cutting and conveying element 4; 4', 4", 5, 5', 5" can be changed independently of the other cutting and conveying elements 4; 4', 4", 5, 5', 5" of the attachment 1 and therefore also by the fact that at least one cutting and conveying element 4; 4', 4", 5, 5', 5" can be reversed and/or taken out of operation independently of the other cutting and conveying elements 4; 4', 4", 5, 5', 5" of the attachment 1. However, there is also provision according to the invention for it to be possible for each of the cutting and conveying elements 4; 4', 4", 5, 5', 5" to be actuated selectively within the abovementioned context.

Here, there is provision for the cutting and conveying elements 4; 4', 4", 5, 5', 5" to be assigned drive elements 11, as a result of the actuation of which the rotational directions 14, 14' can be changed from the driver's seat of the carrier vehicle 2. Each cutting and conveying element 4; 4', 4", 5, 5', 5" is assigned at least one rotational speed sensor 16 and one rotational direction sensor 17.

Here, one embodiment of the invention provides for drive elements to be arranged in series as shifting gear mechanism 12 in the mechanical drive train 15 which is arranged in the rear region 10 of the attachment 1, and which tap off from the latter the required drive torque for the cutting and conveying elements 4; 4', 4", 5, 5', 5". The clutches 13, 13' which act as drive element 11 are shown by way of example as switching elements.

The shifting gear mechanisms 12 are therefore run through by the main drive train 1 which extends transversely with respect to the travel and working direction F and is drive-connected to the drive motor of the carrier vehicle 2, and the cutting and conveying elements 4; 4', 4", 5, 5', 5" are therefore coupled to the latter on the drive side.

As a result of the fact that the clutches 13, 13' of the shifting gear mechanism 12 interact with one another in such a way that they either close or open the drive connection to the cutting and conveying elements 4; 4', 4", 5, 5', 5" as a result of the type of their connection. In the exemplary embodiment according to FIG. 2, the main drive train also retains its rotational direction in the case of reversing. The rotational direction of the conveying disk of the respective cutting and conveying element is determined by which of the two clutches is drive-connected to the main drive train and which is released. If, in contrast, both clutches 13, 13' of the shifting gear mechanism 12 are released, the drive connection of the relevant cutting and conveying element is interrupted completely and therefore taken out of operation.

In the exemplary embodiment of FIG. 3, each shifting gear mechanism comprises only one clutch 13, this embodiment making it necessary that the rotational direction of the main drive train is reversed for reversing purposes, that is to say is likewise inverted, as is already the case in known embodiments of the main drive train 15. Each individual drive connection to the respective cutting and conveying disks can then be produced or interrupted by switching the clutches 13 on and off, which therefore makes it possible to switch the individual cutting and conveying elements on and off selectively, both during normal operation and during reversing operation.

The operating states normal operation, standstill or reversing operation can therefore be actuated for each individual cutting and conveying element 4; 4', 4", 5, 5', 5". Here, the clutch 13, 13' is an integral constituent part of the shifting gear mechanism 12 and it is advantageously configured as a switchable multiple disk clutch. In the exemplary embodiments, the gear mechanisms themselves are shown as bevel gear mechanisms, which is to be considered only by way of example. They can equally be other embodiments of shifting gear mechanisms, as are known in numerous cases in drive technology.

Figure 4:
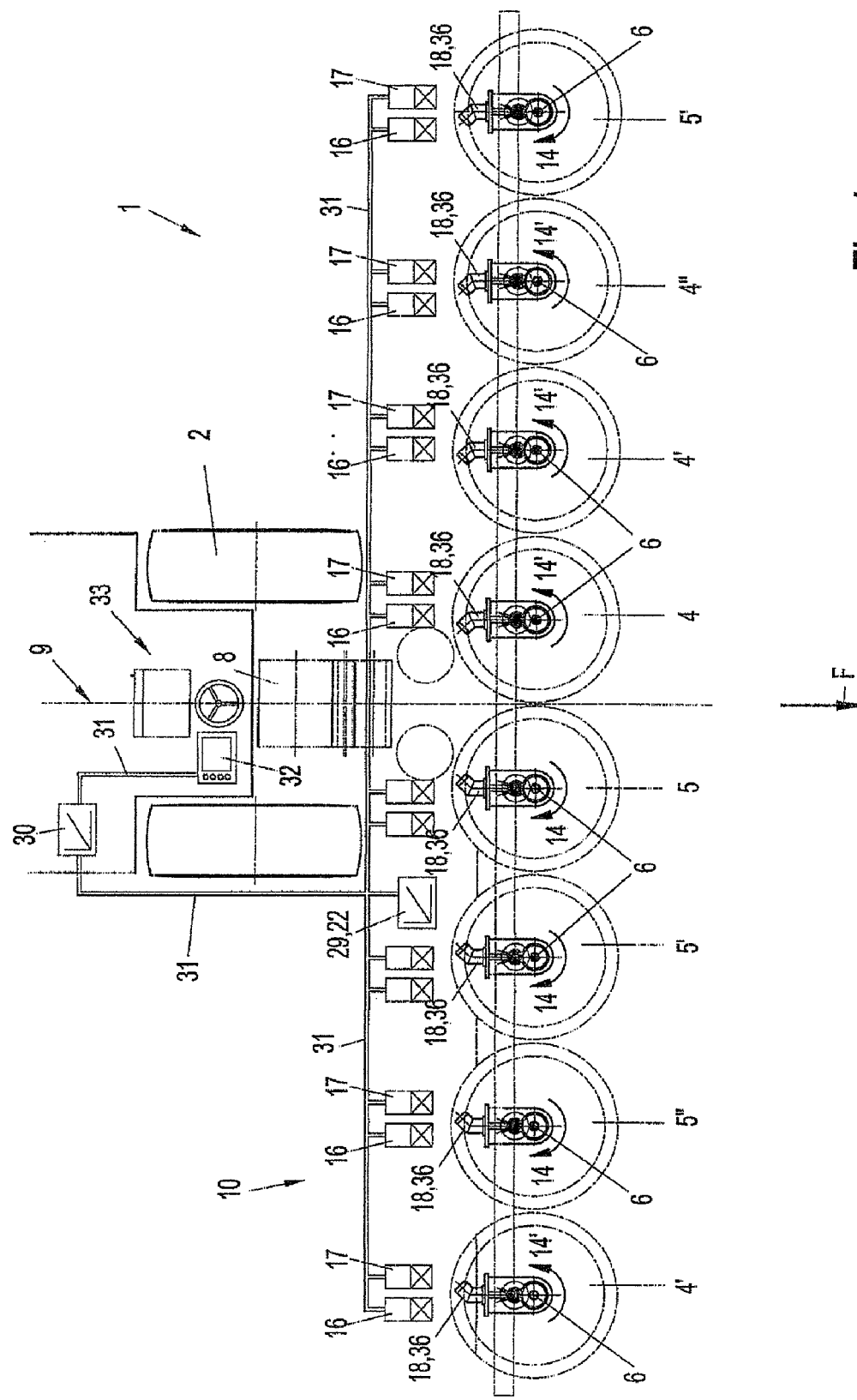
FIG. 4 shows the attachment according to FIG. 1 with a hydraulic drive train according to the invention.
Figure 5:
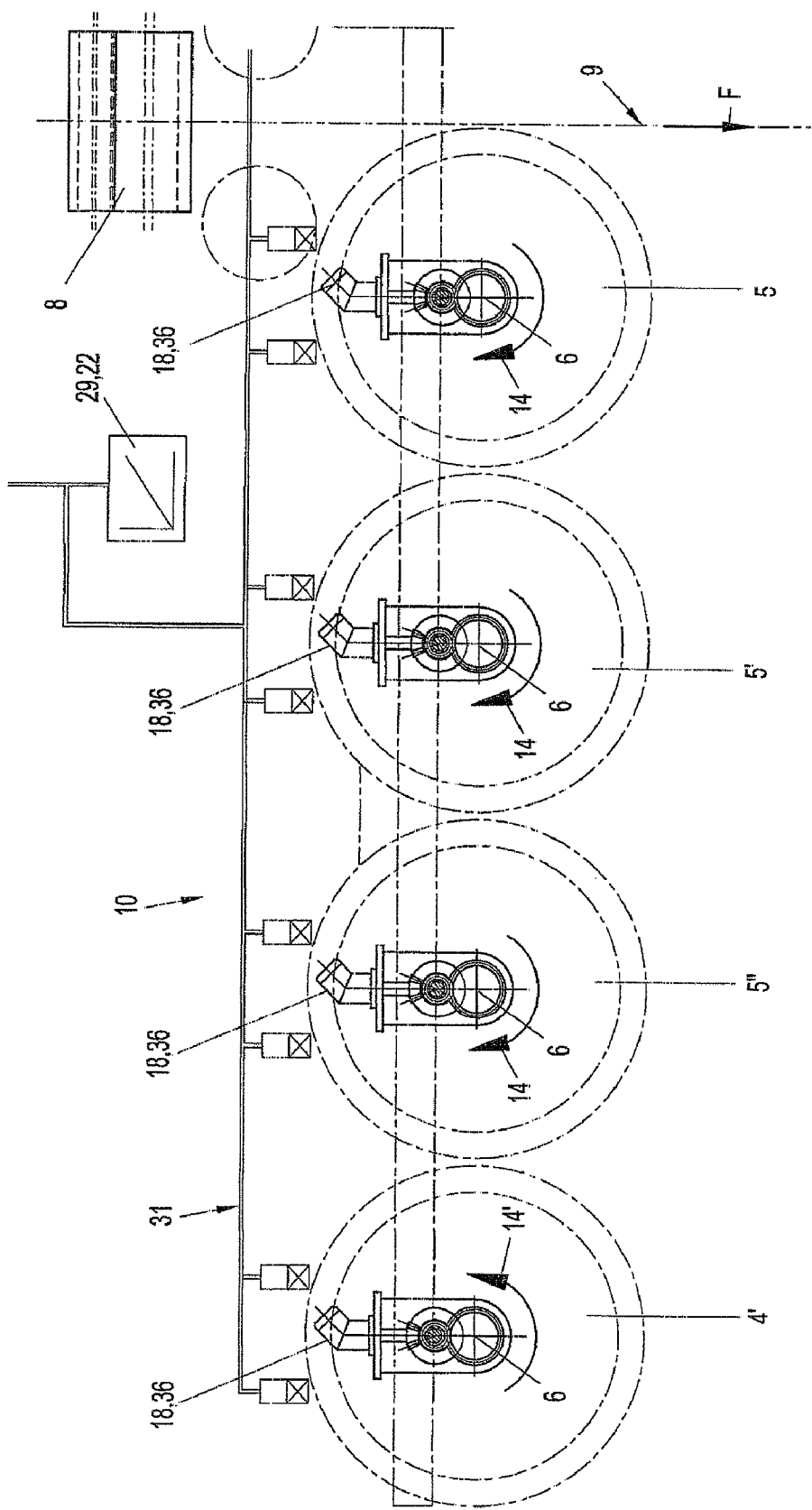
FIG. 5 shows an enlarged detail from FIG. 4.
Figure 6:
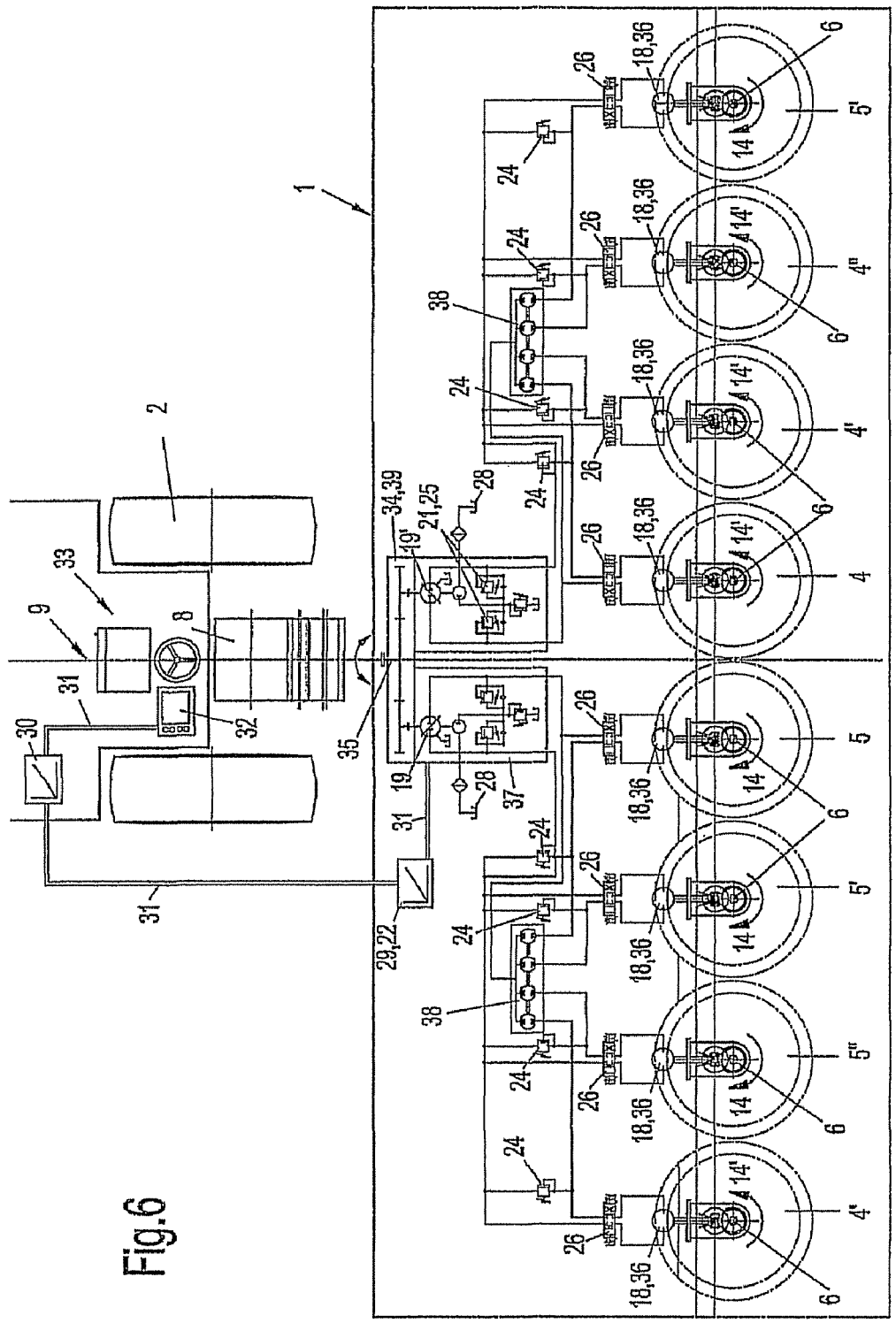
FIG. 6 shows the complete hydraulic drive system in a simplified illustration.

FIG. 4 likewise shows an attachment 1 according to the invention, but with a hydraulic drive of the cutting and conveying elements, and FIG. 5 shows an enlarged detail of the attachment according to FIG. 4. FIG. 6 shows the complete hydraulic drive system in a simplified illustration according to the rules of hydraulic circuit plans.

As shown in FIG. 4 and FIG. 6, according to the invention, the main drive train can also comprise a hydraulic shaft as hydraulic drive system 3, with the result that the drive element 11 is a hydraulic motor 18 which is drive-connected to the drive motor of the carrier vehicle 2 via a hydraulic pump 19, 19'. The exemplary embodiment which is shown illustrates a load-sensing controlled double pump 37 which comprises two individual hydraulic pumps 19, 19' with pressure cut-off means 25 and overload safeguard 21, which is driven by the power take-off shaft of the carrier vehicle 2 via the drive journal 35 of a central gear mechanism 34, configured as a gearwheel train 39. Here, both hydraulic pumps 19, 19' can be actuated separately. Here, they are preferably variable displacement pumps of the swash plate type for mobile applications in a closed circuit. In principle, however, use in an open circuit is also possible. The hydraulic pumps 19, 19' are particularly advantageously configured as variable displacement pumps with a zero position, with the result that they do not deliver any conveying volume in the zero stroke and can also be pivoted in both conveying directions, with the result that the conveying flow reverses its flow direction. As both hydraulic pumps can be actuated independently of one another, the cuffing and conveying elements of the attachment 1 which lie on both sides to the left and the right of the vertical longitudinal center plane 9 can also be actuated and reversed separately and also in groups. In the exemplary embodiment in FIG. 6, the complete hydraulic drive system is shown in simplified form, each cuffing and conveying element 4, 4', 4", 5, 5', 5" also being assigned a separate switching element as actuating device 26 as a 4/3 way control valve (not shown) with shut-off position. As a result of this, the left-hand half and the right-hand half of the attachment can not only be actuated in groups via the pump controller with zero stroke passage, that is to say optionally be set to cutting operation or be taken out of operation or be set to reversing operation, but it is likewise possible to actuate individual cutting and conveying elements 4, 4', 4", 5, 5', 5" selectively with the abovementioned operating conditions. Here, adjacent cutting and conveying elements can also be taken out of operation during reversing.

Here, each drive element 11 as hydraulic motor 18 is assigned an overload safeguard 21 which responds if a predefined threshold value which relates to a maximum predefined drive torque is exceeded, and can also trigger a stop function. The directional valves and the overload safeguard are advantageously configured as pressure limiting valves 24 and are designed in such a way that they are incorporated into the data bus and therefore are present at the inputs and outputs of the microprocessor. A hollow profile of the machine frame 3, for example, can also serve as hydraulic tank 28.

According to the invention, each drive element 11 of the cutting and conveying disks is assigned at least one rotational speed sensor 16 and one rotational direction sensor 17, with the result that its generated measured values can be displayed visually on an actuating and monitoring device 32.

According to the invention, each drive element 11 of a cutting and conveying disk is assigned a slip measuring device 22 which triggers or can trigger a stop function if a threshold value which relates to a predefined nominal rotational speed is exceeded.

It is also possible that the instantaneous travel speed of the carrier vehicle 2 is fed back to the load-sensing regulation within the context of power consumption regulation and/or limitation, as a result of which the travel speed is adapted automatically to the loading behavior.

Here, the microprocessor is situated on the attachment 1, and it is connected to the central controller 30 of the carrier vehicle by means of a data bus 31, in particular via an ISO bus, and can therefore communicate with said central controller 30.

As a result, the driver of the carrier vehicle 2 has the possibility of actuating the drive elements 11 via the central control device 30 from his driver's seat, optionally individually or in groups.

LIST OF DESIGNATIONS

1 Attachment
2 Carrier vehicle (harvesting machine, field chopper)
3 Machine frame
4, 4', 4" Cutting and conveying element (cutting and conveying drum)
5', 5" Cutting and conveying element (cutting and conveying drum)
6, 6' Vertical axes
7 Intake gap
8 Intake housing
9 Vertical longitudinal center plane
10 Rear region
11 Drive element
12 Shifting gear mechanism
13, 13' Clutch
14 Rotational direction in the clockwise direction (right-hand)
14' Rotational direction in the anticlockwise direction (left-hand)
15 Main drive train
16 Rotational speed sensor
17 Rotational direction sensor
18 Hydraulic motor
19, 19' Hydraulic pump
21 Overload safeguard
22 Slip measuring device
23 Hydraulic drive system
24 Pressure limiting device
25 Pressure cutoff means
26 Control valve, directional valve
27 Control device
28 Hydraulic tank
29 Microprocessor
30 Central control device of the carrier Vehicle
31 Data bus
32 Actuating and monitoring device
33 Driver's stand
34 Central transmission
35 Drive journal
36 Straight bevel gear mechanism
37 Double pump
38 Flow divider
39 Gearwheel train
A Working width
F Travel and working direction

What is claimed:

1. An attachment for agricultural harvesting machines for cutting, picking up and further conveying of stalk-like goods that flow into an intake gap of an intake housing of the harvesting machine for further processing, having in each case at least two cutting and conveying elements, which are together positioned on one or each side of a vertical longitudinal center plane and are driven rotationally about vertical axes, means for changing the rotational direction of one cutting and conveying element independently of the other cutting and conveying elements of the attachment, and means for controlling each cutting and conveying element individually and independently.

2. An attachment according to claim 1, wherein at least one cutting and conveying element is at least one of reversible and stoppable independently of the other cutting and conveying elements of the attachment.

3. An attachment according to claim 1, wherein the cutting and conveying elements have associated drive elements to change the rotational directions of the cutting and conveying elements by actuation of said drive elements.

4. An attachment according to claim 3, wherein the drive element is a shifting gear mechanism.

5. An attachment according to claim 3, wherein the drive element is a clutch.

6. An attachment according to claim 3, wherein the drive element can be coupled to a main drive train which is drive-connected to a drive motor of a carrier vehicle.

7. An attachment according to claim 3, wherein the drive element is a hydraulic motor which is drive-connected to the drive motor of a carrier vehicle.

8. An attachment according to claim 3, wherein each drive element is assigned a switching element as an actuating device for switching on, switching off and/or for reversing the rotational direction.

9. An attachment according to claim 3, wherein each drive element is assigned an overload safeguard which reacts and triggers a stop function once a predefined threshold value that relates to a maximum predefined drive torque is exceeded.

10. An attachment according to claim 3, wherein each drive element is assigned at least one rotational speed sensor.

11. An attachment according to claim 3, wherein each drive element is assigned at least one rotational direction sensor.

12. An attachment according to claim 4, wherein the shifting gear mechanism has at least one clutch.

13. An attachment according to claim 4, wherein the shifting gear mechanism has two clutches.

14. An attachment according to claim 13, wherein the clutches of a shifting gear mechanism interact with one another in such a way that they either close, open or reverse the drive connection to the cutting and conveying elements as a result of the type of their connection to a main drive train.

15. An attachment according to claim 12, wherein the clutch is an integral constituent part of the shifting gear mechanism.

16. An attachment according to claim 12, wherein the clutch is configured as a multiple disk clutch.

17. An attachment according to claim 1, wherein said attachment has a closed hydraulic drive system for driving the cutting and conveying elements.

18. An attachment according to claim 17, wherein the closed hydraulic drive system comprises substantially a pump station, hydraulic motors having the associated control valves, a pressure limiting device and a hydraulic tank, the drive of the hydraulic pump being drive-connected to a drive motor of a carrier vehicle.

19. An attachment according to claim 17, wherein the hydraulic drive system is a load-sensing system which is regulated as a function of the load.

20. An attachment according to claim 17, wherein the hydraulic drive system is a load-sensing system which is regulated by pressure and/or conveying flow.

21. An attachment according to claim 17, wherein the hydraulic drive system has a closed hydraulic circuit.

22. An attachment according to claim 17, wherein each hydraulic motor is assigned a pressure cutoff means as an overload safeguard.

23. An attachment according to claim 1, wherein said attachment can be controlled by a central control device of a carrier vehicle.

24. An attachment according to claim 1, wherein said attachment holds a microprocessor.

25. An attachment according to claim 23, further comprising a microprocessor that communicates with an actuating and monitoring device of the harvesting machine via a data bus connection.

26. An attachment according to claim 23, wherein a control device on the attachment and the central control device of the carrier vehicle communicate via a data bus connection.

27. An attachment according to claim 23, wherein the driver of the carrier vehicle can actuate the drive elements via the central control device, optionally in groups.

28. An attachment according to claim 1, wherein selective actuation makes it possible to set in operation or take out of operation or reverse all drive elements or groups thereof.

29. An attachment according to claim 17, wherein an instantaneous driving speed of a carrier vehicle is fed back to the load-sensing regulation, within the context of limiting the power consumption.

30. An attachment according to claim 1, wherein the attachment is a corn picker head.

31. An attachment for agricultural harvesting machines for cutting, picking up and further conveying of stalk-like goods that flow into an intake gap of an intake housing of the harvesting machine for further processing, having in each case at least two cutting and conveying elements, which are spaced apart on both sides of a vertical longitudinal center plane and are driven rotationally about vertical axes, wherein the rotational direction of one cuffing and conveying element is changeable independently of the other cuffing and conveying elements of the attachment, wherein the cuffing and conveying elements have associated drive elements to change the rotational directions of the cuffing and conveying elements by actuation of said drive elements, and wherein each drive element is assigned a slip measuring device which triggers a stop function once a threshold value that relates to a predefined nominal rotational speed is exceeded.

* * * * *

UNITED STATES PATENT AND TRADEMARK OFFICE
CERTIFICATE OF CORRECTION

| | | |
|---|---|---|
| PATENT NO. | : 7,640,718 B2 | Page 1 of 1 |
| APPLICATION NO. | : 11/755214 | |
| DATED | : January 5, 2010 | |
| INVENTOR(S) | : Helmut Altepost and Hans Rauch | |

It is certified that error appears in the above-identified patent and that said Letters Patent is hereby corrected as shown below:

Title page, Item (75) Inventors: please change the address of Helmut Altepost from "Höstel-Riesenbeck" to --Hörstel-Riesenbeck--

Column 3
    *Line 65*: please change "cuffing" to --cutting--

Column 4
    *Lines 17, 23, 25, 30, 33, 46 and 49*: please change "cuffing" to --cutting--

Column 6
    *Lines 23 and 28*: please change "cuffing" to --cutting--

Column 8
    *Line 41*: please change "cuffing" to --cutting--

Column 10
    *Lines 10-12 and 14*: please change "cuffing" to --cutting--

Signed and Sealed this

Thirteenth Day of April, 2010

David J. Kappos
*Director of the United States Patent and Trademark Office*